(12) United States Patent
Kong et al.

(10) Patent No.: US 9,324,351 B2
(45) Date of Patent: Apr. 26, 2016

(54) CONTACT PAD FOR RECORDING HEADS (71) Applicant: Seagate Technology LLC, Cupertino, CA (US)

(72) Inventors: Xiaohang Kong, Londonderry (IE); Neil Zuckerman, Eden Prairie, MN (US); Erik Hutchinson, Eden Prairie, MN (US); Raul Andruet, Woodbury, MN (US); Dion Song, Eden Prairie, MN (US); Christopher Rea, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/074,157

(22) Filed: Nov. 7, 2013

(65) Prior Publication Data

US 2015/0124354 A1    May 7, 2015

(51) Int. Cl.
  *G11B 5/127*    (2006.01)
  *G11B 5/60*    (2006.01)
  *G11B 5/31*    (2006.01)

(52) U.S. Cl.
  CPC .............. *G11B 5/607* (2013.01); *G11B 5/3106* (2013.01)

(58) Field of Classification Search
  CPC ...... G11B 5/607; G11B 5/3133; G11B 17/32; G11B 5/3106
  USPC .............. 360/125.31, 125.32, 125.74, 125.75
  See application file for complete search history.

(56) References Cited

U.S. PATENT DOCUMENTS

| | | | |
|---|---|---|---|
| 5,420,735 A | 5/1995 | Haines | |
| 5,455,730 A | 10/1995 | Dovek et al. | |
| 5,557,488 A | 9/1996 | Hamilton et al. | |
| 5,703,740 A | 12/1997 | Cohen et al. | |
| 5,742,998 A | 4/1998 | Jones, Jr. | |
| 5,757,582 A | 5/1998 | White et al. | |
| 6,411,470 B1 | 6/2002 | Hamilton et al. | |
| 6,493,185 B1 | 12/2002 | Dorius et al. | |
| 6,625,109 B1 | 9/2003 | Mitsuoka et al. | |
| 6,654,206 B2 | 11/2003 | Hipwell et al. | |
| 6,690,545 B1 | 2/2004 | Chang et al. | |
| 6,967,818 B2 | 11/2005 | Baumgart et al. | |
| 7,218,478 B2 | 5/2007 | Mate et al. | |
| 7,259,931 B2 | 8/2007 | Baldwinson et al. | |
| 7,564,649 B2 | 7/2009 | Hanchi et al. | |
| 8,125,728 B2 | 2/2012 | Kurita et al. | |
| 8,149,541 B2 | 4/2012 | Baumgart et al. | |
| 8,259,540 B1 | 9/2012 | Sahoo et al. | |
| 8,310,779 B2 | 11/2012 | Hanchi et al. | |
| 8,395,863 B2 | 3/2013 | Thurn et al. | |
| 8,477,572 B1 | 7/2013 | Sahoo et al. | |
| 2002/0044384 A1 | 4/2002 | Hipwell et al. | |
| 2002/0191326 A1* | 12/2002 | Xu et al. | 360/75 |

(Continued)

*Primary Examiner* — Gustavo Polo
(74) *Attorney, Agent, or Firm* — Westman, Champlin & Koehler, P.A.

(57) ABSTRACT

A recording head that includes at least one protection feature that prevents at least one other feature of the recording head from directly colliding with a data storage medium with which the recording head communicates. The recording head includes a transducer element having a leading edge and a trailing edge. The recording head also includes a transducer element heater located closer to the leading edge of the transducer element than the trailing edge of the transducer element. A contact pad is interposed between the leading edge of the transducer element and the transducer element heater to prevent the transducer element from directly colliding with the data storage medium.

20 Claims, 6 Drawing Sheets

(56) References Cited

U.S. PATENT DOCUMENTS

| | | |
|---|---|---|
| 2005/0018347 A1 | 1/2005 | Hsiao et al. |
| 2005/0264949 A1* | 12/2005 | Gao et al. .................. 360/324 |
| 2006/0067002 A1 | 3/2006 | Mate et al. |
| 2007/0177300 A1 | 8/2007 | Yin et al. |
| 2010/0097721 A1 | 4/2010 | Baumgart et al. |
| 2010/0265618 A1 | 10/2010 | Boutaghou et al. |
| 2011/0069408 A1 | 3/2011 | Kurita et al. |
| 2011/0267715 A1* | 11/2011 | Heim et al. .................. 360/59 |
| 2012/0026625 A1 | 2/2012 | Thurn et al. |
| 2013/0063834 A1 | 3/2013 | Hanchi et al. |
| 2013/0182545 A1 | 7/2013 | Sahoo et al. |

* cited by examiner

CONTACT PAD FOR RECORDING HEADS

BACKGROUND

Data storage systems commonly have a recording head that includes a read transducer that reads information from a data storage medium and a write transducer that writes information to a data storage medium. Recording heads may also include other components such as a heater that is utilized to actuate, for example, the read transducer and/or the write transducer. A spacing of the recording head from the storage medium affects the strength of the read signal and the strength of the write signal. To achieve higher recording densities, the head is positioned closer to the medium, which decreases a head-medium spacing or fly height. The decreased fly height increases the propensity of the head to collide with asperities or particles on the medium and thereby increases the propensity for damage to the read transducer and the write transducer.

SUMMARY

The present disclosure relates to a recording head that includes at least one protection feature that prevents at least one other feature of the recording head from directly colliding with a data storage medium with which the recording head communicates. The recording head includes a transducer element having a leading edge and a trailing edge. The recording head also includes a transducer element heater located closer to the leading edge of the transducer element than the trailing edge of the transducer element. A contact pad is interposed between the leading edge of the transducer element and the transducer element heater to prevent the transducer element from directly colliding with the data storage medium.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of recording heads described below incorporate a contact pad or bumper, which includes a "close point" or "close region" that is closer to a data storage medium than a read transducer and/or a write transducer in the head during a read/write operation, for example, to the data storage medium. In an event of collision of the head with an asperity on the medium, or during deliberate contact between the head and the medium during head-medium clearance setting, for example, the contact pad receives a majority of the contact load and thereby prevents the transducer elements from being subjected to high stress.

Figure 1:
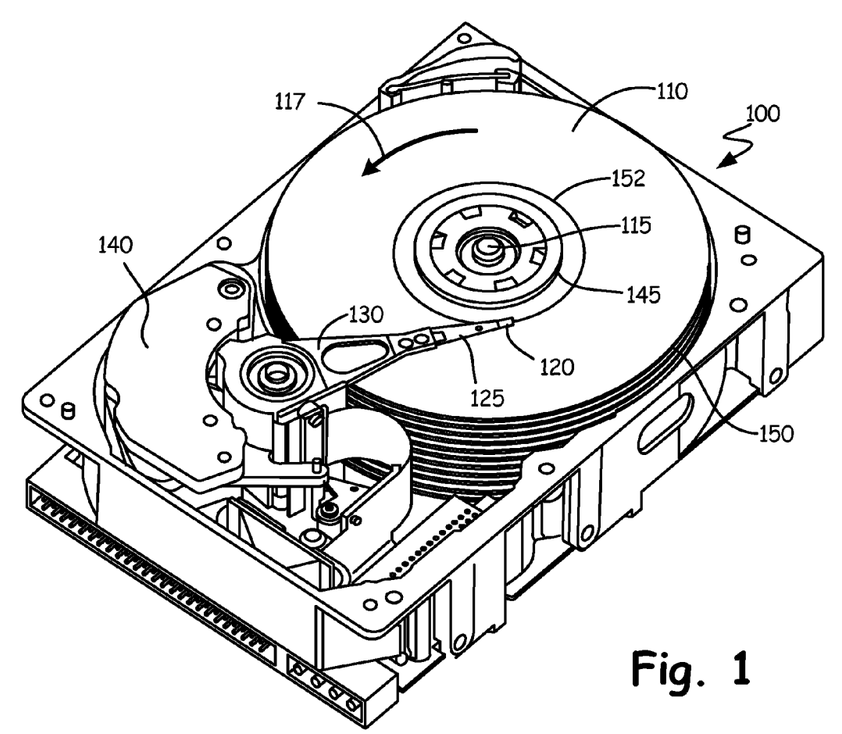
FIG. 1 is a perspective view of a data storage system.
Figure 2:
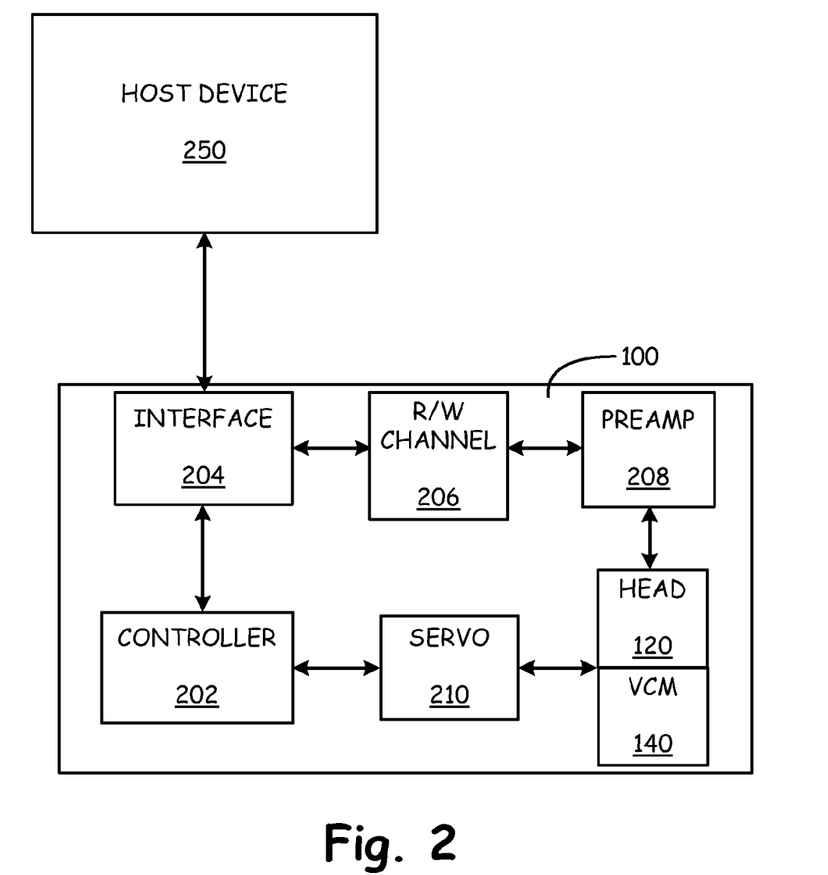
FIG. 2 is a generalized functional block diagram of a data storage system.
Figure 3:
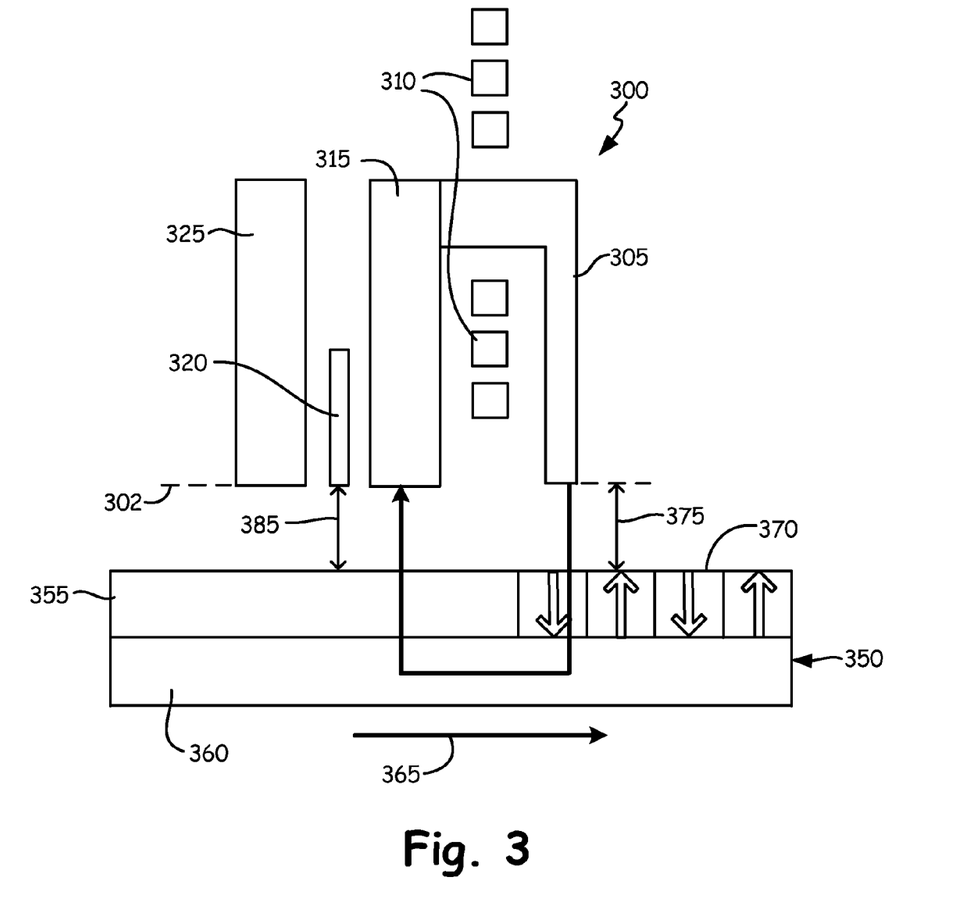
FIG. 3 is a schematic diagram of a cross-section of a recording head that reads from and writes to a storage medium.

FIGS. 1, 2 and 3 are illustrative operating environments in which certain specific embodiments disclosed herein may be incorporated. The operating environments shown in the figures are for illustration purposes only. Embodiments of the present disclosure are not limited to any particular operating environment such as those shown in FIGS. 1, 2 and 3. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure.

Disc drive 100 includes a data storage medium (for example, a magnetic or optical disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

FIG. 3 is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3 are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure are practiced in all types of recording heads and media.

Recording head 300 includes a write pole 305, a magnetization coil 310, a return pole 315, a read transducer 320, and a bottom shield 325. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

FIG. 3 includes a spacing 375 that represents the spacing or distance between write pole 305 and the surface of storage medium 350. Spacing 375 is one factor that determines the strength of a magnetic field on the storage medium. As spacing 375 increases, the strength of the magnetic field decreases. If spacing 275 is too great, the magnetic field may be too weak to write efficiently.

FIG. 3 also includes a spacing 385 that represents the spacing or distance between read transducer 320 and the surface of storage medium 350. Spacing 385 is one factor that determines the ability of transducer 320 to detect magnetization patterns recorded to medium 350. Transducer 320 is illustratively better able to detect magnetization patterns as spacing 385 decreases.

Figure 4:
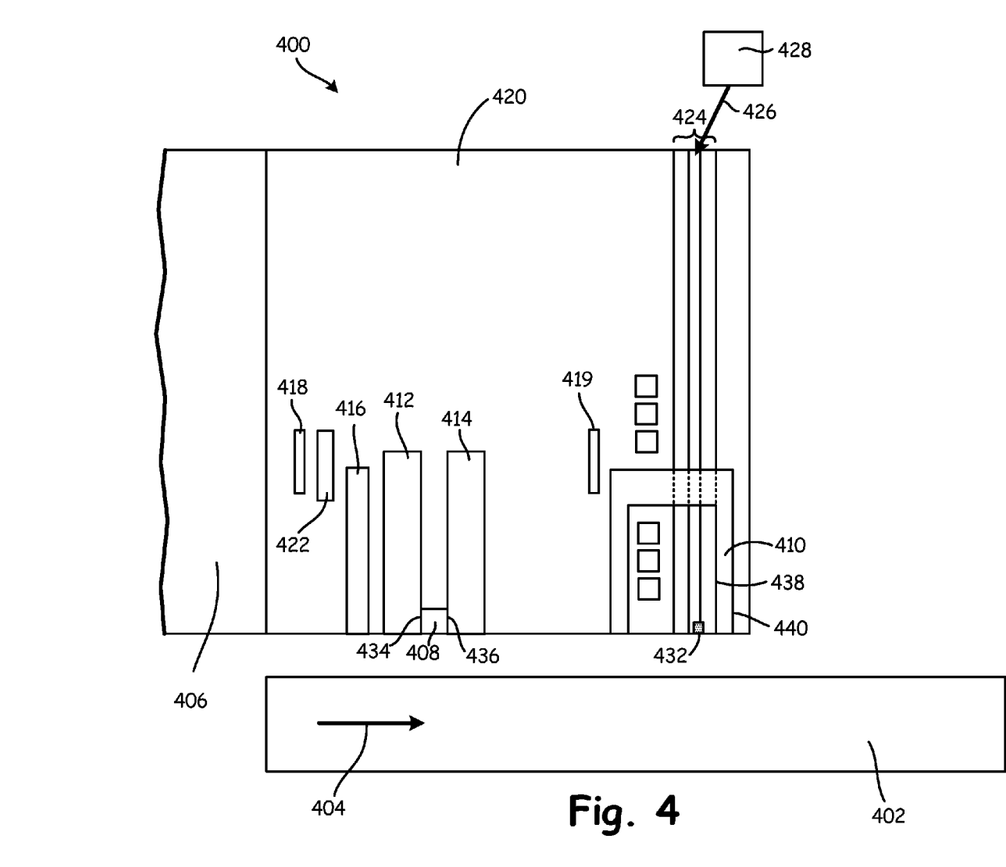
FIG. 4 is a diagrammatic illustration of a recording head that includes a contact pad in accordance with one embodiment.

FIG. 4 is a diagrammatic illustration of portions of a recording head 400 including a contact pad in accordance with one embodiment. Recording head 400 reads data from, and writes data to, data storage medium 402. A direction of motion of data storage medium 402 is designated by reference numeral 404 in FIG. 4. Recording head 400 includes a substrate 406, a read transducer 408, a write transducer 410, a bottom read transducer shield 412 and a top read transducer shield 414, a contact pad 416, a read transducer heater 418, a write transducer heater 419 and a wafer overcoat 420. In some embodiments, recording head 400 may also include one or more push blocks 422, which are described further below.

In certain embodiments, recording head 400 is configured to locally heat the data storage medium 402 and thereby facilitate heat assisted magnetic recording (HAMR). In HAMR embodiments, recording head 400 may further include a wave guide 424 that receives a light beam 426 from a suitable source 428 and propagates the light beam towards a bearing surface 430 of recording head 400. A near field transducer 432 that is located proximate to the bearing surface 430 receives the light and focuses it onto the data storage medium 402.

As can be seen in FIG. 4, the read transducer 408 has a leading edge 434 with respect to the direction of motion 404 of the storage medium 402 and a trailing edge 436 with respect to the direction of motion 404 of the storage medium 402. The contact pad 416 is interposed between the leading edge 434 of the read transducer 408 and the read transducer heater 418. As indicated earlier, the contact pad 416 is included in head 400 to avoid possible mechanical damage to, and to reduce stresses on, read transducer 408. Contact pad 416 may similarly protect other transducer elements of recording head 400 such as write transducer 410 and near field transducer 432. Write transducer 410 has a leading edge 438 and a trailing edge 440 with respect to the direction of motion 404 of the storage medium 402.

Contact pad 416 may be formed at a wafer level during micro-fabrication of the recording head 400. Specifically, in some embodiments, contact pad 416 is integrally formed as part of a parallel process for forming multiple heads on a substrate wafer. In such embodiments, contact pad 416 is not a part of a bearing surface overcoat (not shown) formed on surface 430 of the recording head 400 subsequent to the wafer-level micro-fabrication. In other embodiments, a portion of the contact pad 416 may be included in the bearing surface overcoat.

Contact pad 416 may be formed of any suitable magnetic and/or non-magnetic materials, which may include metals, ceramics, etc. In some embodiments, a suitable non-magnetic material for contact pad 416 may be a nickel-phosphorous alloy (NiP), a nickel-copper (NiCu) alloy or any other suitable non-magnetic material or combination of non-magnetic materials. In other embodiments, a magnetic material such as nickel-iron-cobalt (NiFeCo) or any other suitable magnetic material may be used to form contact pad 416. In general, materials utilized for contact pad 416 may vary according to different types of applications in which contact pad 416 is used. Materials for contact pad 416 may typically be selected such that contact pad 416 has a higher coefficient of thermal expansion (CTE) and a higher elastic modulus than the reader shields 412 and 414.

Substrate 406 may comprise aluminum oxide and titanium carbide or any other suitable material or combination of materials. Wafer overcoat 420 is applied during wafer fabrication to cover different transducers (for example, elements 408, 410, etc.). In some embodiments, wafer overcoat 420 may be formed of a material that is substantially softer than the material(s) used for substrate 406. In one embodiment, wafer overcoat 420 is formed of alumina. Of course, wafer overcoat 420 may be formed of any other suitable material or materials. It should be noted that wafer overcoat 420 is a separate and different element from the bearing surface overcoat (not shown), which, as noted above, is applied to the recording head 400 at the bearing surface 430 to provide wear resistance and may be formed of carbon, for example.

Read transducer heater 418, which is used to actuate the read transducer 408 and other features of the head 400 that are proximate to the read transducer 408, is designed and positioned such that it efficiently actuates a relatively large area of the contact pad 416. In some embodiments, read transducer heater 418 is resistive heater and can comprise a metal film that is connected to head-heating circuitry (not shown) in, for example, preamp 208 shown in FIG. 2. In certain embodiments, write transducer heater 419 may be substantially similar to read transducer heater 418. In general, heaters 418 and 419 serve as actuators for other elements within recording head 400. In some embodiments, actuation elements other than heating elements may be employed in recording head 400. In certain embodiments, contact pad 416 may, without actuation, protrude substantially farther than the other transducing elements at the bearing surface 430 and therefore no actuation elements may be employed in recording head 400 in such embodiments.

As noted above, in some embodiments, recoding head 400 also includes a push block 422. In such embodiments, read transducer heater 418 transfers heat to push block 422, which controls shape and actuation efficiency within recording head 400 by properly distributing the heat generated by heater 418. Push block 422 may comprise a high CTE material such as copper or any other suitable material or materials. In certain embodiments, a second push block (not shown) may be positioned proximate to write transducer heater 419 to improve heat distribution. In general, any suitable number of push blocks may be included within recording head 400. As indicated above, the contact pad 416 must protrude farther than the read transducer 408 at the bearing surface 430 at least when the read transducer heater 418 is in an active state. As noted above, this may be enabled by selecting a pad material that has a similar or greater protrusion than the read transducer 408 and read transducer shields 412 and 414 in a passive (cold) state, following wafer-, bar-, and slider-level processing, and positioning the read transducer heater 418 up-track from the contact pad 416. A down-track spacing between the contact pad 416 and the bottom read transducer shield 412 is designed to ensure that the read transducer 408 has enough recession from the contact pad 416 following actuation. By increasing a distance between the read transducer 408 and the read transducer heater 418, a temperature of the read transducer 408 may be reduced in comparison with recording heads that do not include a contact pad such as 416. The reduction in the temperature of the read transducer 408 has a positive influence on a stability of the read transducer 408 and on a reliability of a data storage device/system in which the read transducer 408 is incorporated.

Figure 5:
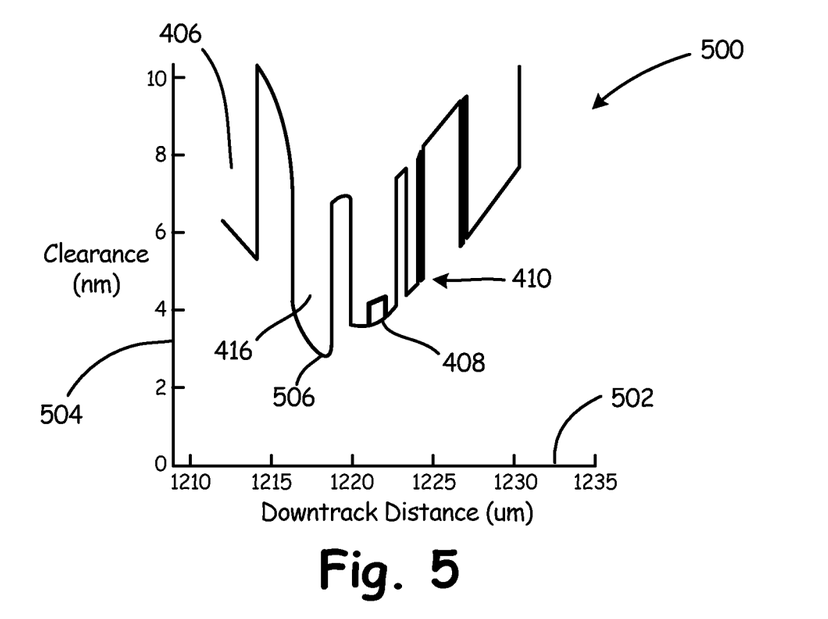
FIG. 5 is a graph that illustrates dimensions and clearance values of different features of a recording head in accordance with one embodiment.

FIG. 5 is a graph 500 that illustrates dimensions and clearance values of different features of a recording head in accordance with one embodiment. Certain reference numerals utilized in FIG. 4 are used again in FIG. 5 to denote elements that are common to both figures. In FIG. 5, a horizontal axis 502 represents down-track distance in micrometers (un) and a vertical axis 504 represents head-medium spacing or clearance in un between points on the bearing surface and the storage medium. It should be noted that, in FIG. 5, the position of the storage medium is along the horizontal axis 502. As can be seen in FIG. 5, a bottom most portion of contact pad 416 is a "close point" 506 of head 400, which is closer to the data storage medium (positioned along horizontal axis 502) than the read transducer 408, the write transducer 410, the substrate 406, etc.

Figure 6:
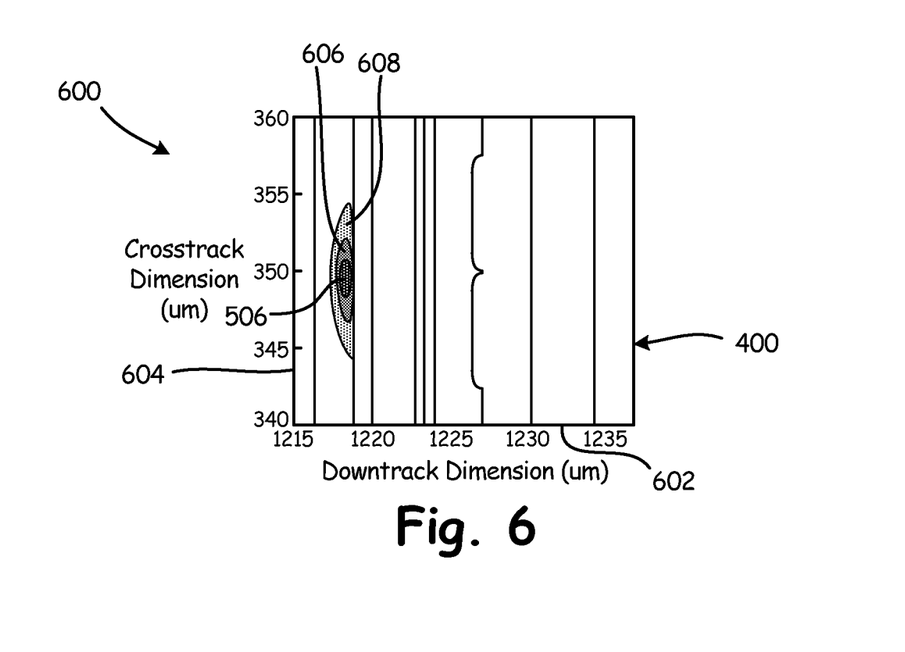
FIG. 6 is a contour plot of a bearing surface of a recording head showing pressures on a contact pad.

FIG. 6 is a contour plot 600 of a bearing surface of recording head 400 showing pressures on a contact pad. The same reference numerals have been used to denote elements that are common to FIG. 6 and FIG. 4 and/or FIG. 5. In FIG. 6, a horizontal axis 602 represents down-track dimensions of recording head 400 in micrometers and a vertical axis 604 represents cross-track dimensions of recording head 400 in micrometers. A darkest region in FIG. 6, which is a close point or highest pressure point 506 of recording head 400, is a bottom most portion of contact pad 416. Pressure decreases with movement away from the close point 506 as can be seen in progressively lighter regions 606 and 608 in FIG. 6.

Referring back to FIG. 3, spacings and 375 and 385 represent distances between the write transducer and the storage medium and the read transducer and the storage medium, respectively. In general, for maximum read performance, a goal would be to position the read transducer at the close point. Similarly, for maximum write performance, the goal would be to position the write transducer at the close point. However, to protect the read and/or write transducers from colliding with the storage medium during operation, the embodiments described above in connection with FIGS. 4, 5 and 6 position the contact pad at the close point.

Figure 7:
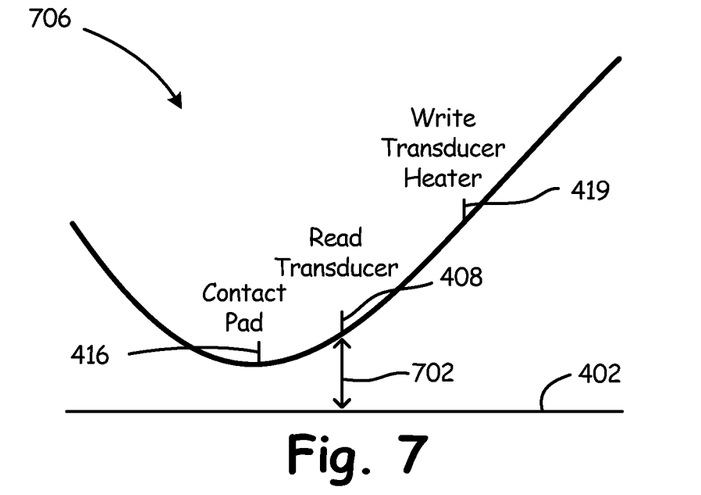
FIG. 7 is a diagrammatic illustration of a down-track profile of a recording head with a read transducer heater in an active state.
Figure 8:
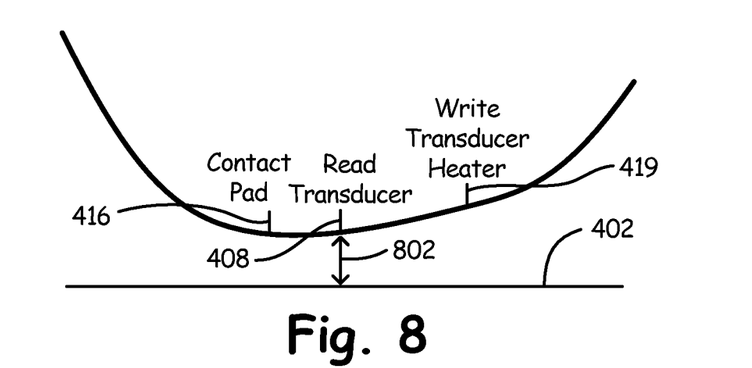
FIG. 8 is a diagrammatic illustration of a down-track profile of a recording head with both a read transducer heater and a write transducer heater activated.

Referring back to FIG. 4, during a read operation, for example, activation of the read transducer heater 418 (not shown in FIG. 7) results in contact pad 416 being positioned at the close point. FIG. 7 is a diagrammatic illustration of a down-track profile 700 of a recording head such as 400 with only the read transducer heater 418 (not shown in FIG. 7) activated. As can be seen in FIG. 7, a shape of profile 700 is such that a spacing 702 between the read transducer 408 and the data storage medium 402 may be relatively large. The relatively large spacing decrease the ability of the read transducer 408 to detect magnetization patterns, for example, on the data storage medium 402. Thus, such a configuration, with only a single heater activated, may be more suitable for operations such as thermal asperity detection than reading user data because target clearance for the read transducer 408 is difficult to obtain with heat energy from the single heater positioned as shown in FIG. 4. A secondary concern may be that when the single heater positioned as shown in FIG. 4 is used to push the read transducer 408 to the target clearance, the read transducer 408 would typically be close to, or at, its maximum temperature, which could cause magnetic instability. This may be addressed by additionally activating the second heater 419. FIG. 8 is a diagrammatic illustration of a down-track profile 800 of a recording head such as 400 with both read transducer heater 418 (not shown in FIG. 8) and write transducer heater 419 activated. Spacing 802 is substantially less than spacing 702 of FIG. 7 and therefore this configuration is suitable for carrying out read operations. By employing the second heater to efficiently control the read transducer to target clearance, the temperature of the read transducer is reduced relative to the single heater configuration due to a distance between heater 419 and read transducer 408 being greater than a distance between heater 418 and read transducer 408.

Although various uses of the contact pad are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the contact pad while maintaining substantially the same functionality without departing from the scope and spirit of the present disclosure. In addition, although the preferred embodiment described herein is directed to particular type of contact pad utilized in a particular data storage system, it will be appreciated by those skilled in the art that the teachings of the present disclosure can be applied to other data storage devices, such as optical devices, without departing from the scope and spirit of the present disclosure.

What is claimed is:

1. A recording head comprising:
a transducer element having a leading edge and a trailing edge;
a transducer element heater located closer to the leading edge of the transducer element than the trailing edge of the transducer element;
a contact pad interposed between the leading edge of the transducer element and the transducer element heater;

a shield interposed between the transducer element and the contact pad; and a wafer overcoat that covers the transducer element, the transducer element heater, the contact pad and the shield, wherein the contact pad is formed of a material that is different from a material of the water overcoat.

2. The recording head of claim 1 and wherein the transducer element is a read transducer and wherein the transducer element heater is a read transducer heater.

3. The recording head of claim 1 and wherein the transducer element is one of a write transducer or a near field transducer.

4. The recording head of claim 1 and further comprising a push block interposed between the contact pad and the transducer element heater.

5. The recording head of claim 4 and wherein the push block comprises copper.

6. The recording head of claim 1 and wherein the contact pad comprises at least one of non-magnetic material or magnetic material.

7. The recording head of claim 6 and wherein the non-magnetic material comprises nickel and phosphorous.

8. The recording head of claim 6 and wherein the magnetic material comprises nickel, iron and cobalt.

9. The recording head of claim 2 and further comprising a write transducer located closer to the trailing edge of the reach transducer than the leading edge of the read transducer, and a write transducer heater interposed between the trailing edge of the read transducer and the write transducer.

10. The recording element of claim 1 and wherein a coefficient of thermal expansion and an elastic modulus of the contact pad are higher than a coefficient of thermal expansion and an elastic modulus of the shield.

11. The recording head of claim 10 and further comprising a bearing surface.

12. The recording head of claim 11 and wherein the contact pad and the transducer element are substantially flush at the bearing surface when the transducer element heater is in a passive state, and wherein the contact pad protrudes below the transducer element at the bearing surface when the transducer element heater is in an active state.

13. The recording head of claim 11 and wherein the contact pad protrudes below the transducer element at the bearing surface when the transducer element heater is in a passive state and when the transducer element heater is in an active state.

14. An apparatus comprising:
a data storage medium;
a first transducer element configured to communicate with the storage medium, the transducer element having a leading edge with respect to a direction of motion of the storage medium and a trailing edge with respect to the direction of motion of the storage medium;

a first transducer element heater located closer to the leading edge of the first transducer element than the trailing edge of the first transducer element;

a contact pad disposed between the leading edge of the first transducer element and the first transducer element heater;

a second transducer element configured to communicate with the storage medium, the second transducer element is located closer to the trailing edge of the first transducer element than the leading edge of the first transducer element;

a second transducer heater element interposed between the trailing edge of the first transducer element and the second transducer element; and a wafer overcoat that covers the first transducer element, the first transducer element heater, the contact pad, the second transducer element and the second transducer element heater, wherein the contact pad is formed of a material that is different from a material of the wafer overcoat.

15. The apparatus of claim 14 and wherein the first transducer element is a read transducer and the second transducer is one of a write transducer or a near field transducer.

16. The apparatus of claim 14 and further comprising a push block interposed between the contact pad and the first transducer element heater.

17. An apparatus comprising:
a data storage medium; and
a head comprising:
a transducer element configured to communicate with the storage medium, the transducer element having a leading edge with respect to a direction of motion of the storage medium and a trailing edge with respect to the direction of motion of the storage medium; and a contact pad located closer to the leading edge of the transducer element than the trailing edge of the transducer element; and a shield interposed between the transducer element and the contact pad, wherein the transducer element, the contact pad and the shield are within a wafer overcoat, and wherein the contact pad if formed of a material that is different from a material of the wafer overcoat.

18. The apparatus of claim 17 and wherein the head further comprises a bearing surface, and wherein the contact pad protrudes below the transducer element at the bearing surface.

19. The apparatus of claim 17 and wherein the transducer element is one of a read transducer, a write transducer or a near field transducer.

20. The apparatus of claim 19 and wherein the contact pad comprises nickel and phosphorous.

* * * * *